US007463164B2

(12) United States Patent
Williams et al.

(10) Patent No.: US 7,463,164 B2
(45) Date of Patent: Dec. 9, 2008

(54) METHOD AND APPARATUS FOR REMOTE CONTROL OF ELECTRONIC EQUIPMENT

(76) Inventors: Don P. Williams, 4885 Highway 53, Harvest, AL (US) 35749; Mark T. Bowers, 5555 Bannergate Dr., Alpharetta, GA (US) 30022

( * ) Notice: Subject to any disclaimer, the term of this patent is extended or adjusted under 35 U.S.C. 154(b) by 370 days.

(21) Appl. No.: 11/051,205

(22) Filed: Feb. 5, 2005

(65) Prior Publication Data

US 2005/0179558 A1 Aug. 18, 2005

Related U.S. Application Data

(60) Provisional application No. 60/544,448, filed on Feb. 13, 2004.

(51) Int. Cl.
*H04B 10/00* (2006.01)

(52) U.S. Cl. ................................................ 340/825.69

(58) Field of Classification Search ............ 340/825.69, 340/5.23, 538, 825.72, 825.34, 5.28
See application file for complete search history.

(56) References Cited

U.S. PATENT DOCUMENTS

| | | | | |
|---|---|---|---|---|
| 4,623,887 | A | 11/1986 | Welles, II | |
| 4,626,848 | A | 12/1986 | Ehlers | |
| 4,825,200 | A | 4/1989 | Evans et al. | |
| 4,866,434 | A | 9/1989 | Keenan | |
| 4,905,279 | A | 2/1990 | Nishio | |
| 5,028,919 | A | 7/1991 | Hidaka | |
| 5,194,978 | A | 3/1993 | Heep | |
| 5,229,763 | A | 7/1993 | Nakamaru | |
| 5,243,430 | A * | 9/1993 | Emmons | 348/734 |
| 5,386,251 | A | 1/1995 | Movshovich | |
| 5,414,426 | A | 5/1995 | O'Donnell et al. | |
| 5,684,471 | A * | 11/1997 | Bernardi et al. | 340/825.72 |
| 5,691,710 | A | 11/1997 | Pietraszak et al. | |
| 5,883,680 | A * | 3/1999 | Nykerk | 348/734 |
| 5,959,751 | A | 9/1999 | Darbee et al. | |
| 6,265,987 | B1 | 7/2001 | Wang et al. | |
| 6,587,067 | B2 | 7/2003 | Darbee et al. | |
| 6,714,136 | B1 | 3/2004 | Auyang et al. | |
| 6,771,182 | B1 * | 8/2004 | Loh et al. | 340/825.72 |
| 2002/0159611 | A1 * | 10/2002 | Cromer et al. | 381/303 |

* cited by examiner

*Primary Examiner*—Brian Zimmerman
*Assistant Examiner*—Nabil H Syed

(57) ABSTRACT

A remote control unit that learns commands from associated remote control units associated with specific pieces of electronic equipment is described. The remote control unit stores commands that are learned and in addition stores time delays that are needed to provide the desired sequential operation of electronic equipment. The remote control unit, upon pressing a single button, sends a replica of signals and delays that a user would use when interacting with the pieces of electronic equipment. The remote control unit further has a prohibited operation window wherein a signal cannot be sent from the remote control unit.

20 Claims, 12 Drawing Sheets

METHOD AND APPARATUS FOR REMOTE CONTROL OF ELECTRONIC EQUIPMENT

CROSS-REFERENCE TO RELATED APPLICATIONS

This application is related to Williams et al., U.S. Provisional Patent Application No. 60/544,448, entitled "Method and Apparatus for Remote Control of Electronic Equipment" filed on Feb. 13, 2004 and is incorporated by reference herein, with priority claimed for all commonly disclosed subject matter.

A Utility Patent Application for Don P. Williams, a citizen of the United States, who resides at 4885 Highway 53, Harvest, Ala. and Mark T. Bowers, a citizen of the United States, who resides at 5555 Bannergate Drive, Alpharetta, Ga.

FIELD OF THE INVENTION

The present invention generally relates to the remote control of electronic equipment such as television sets, video players, radios and similar equipment.

RELATED ART

The use of a remote control for controlling a television set or other video equipment is based on transmitting an encoded infrared signal containing information. The encoded signal is then decoded by a receiver in the television set and the transmitted information is used to perform a desired function, such as turning the set on, changing channels, adjusting volume, switching to a different antenna connection or some other function. When several electronic devices are connected together, such as a television set and a video player, it may be necessary to use two control units. In some cases a single control unit may serve as a controller for both the television and the video player.

A good source of entertainment and education for children is the plethora of programs available as broadcast programs, video tapes and DVDs. Because children learn quickly how to use remote control units for viewing a desired program, they are usually able to make the necessary equipment work for viewing a selected program. The age at which this skill is obtained may be 3 or 4 years old in some cases. However, a younger viewer, such as a 1 year old, may wish to watch a video and yet not have the ability to make the necessary equipment work together. It is therefore desirable to have a device, a new remote control unit, that would allow these younger viewers to watch a program at their convenience.

It is also desirable to have parental supervision in order to prohibit children from using the remote control to watch programs at undesirable times, such as at night or sleep time. It is also desirable to have a lock-out feature that prevents the young user from repeatedly sending command sequences after the first sequence has been transmitted. In addition to having a convenient way for younger viewers to start video programs, the new remote control should be easy to program or reprogram by the parent.

SUMMARY OF THE DISCLOSURE

Generally, the present invention provides a new apparatus and method for controlling electronic equipment such as video equipment and audio equipment. The apparatus, a remote control unit, is directed to young users and allows such users to view programs at their convenience by pushing a button on the unit. The remote control also allows the authoritative figure with the ability to control the time periods the unit is functional. The ease of programming by sending the actual commands to achieve the desired result to associated electronic devices while the remote control unit stores the complex sequence, commands and delays between commands, is not available on conventional remote units. The ease of use provided by pushing the button and transmitting desired command signals merged with essential delays is not available on conventional control units. Furthermore, the apparatus will function with a plurality of electronic equipment from a variety of manufacturers. It is intended that all such features and advantages be included herein and that the scope of the present invention be protected by a set of claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

The present invention generally pertains to a remote control unit for turning video equipment on and off and for selecting actions of such equipment. Although there are conventional remote control devices, referred to hereafter as "associated remote control units" available for controlling video equipment, none of these associated remote control units have the features and characteristics of the remote control unit of the present disclosure. The present disclosure is directed to device for providing young users, generally around one to three years old, a method to turn on several pieces of video equipment with one press of a single push button. Further, the remote control unit of the present disclosure has an input feature available for programming by a parent or other adult. The term remote control user or "user" refers to anyone using the remote control unit and the term "programmer" refers to the person programming the remote control unit. The remote control unit of the present disclosure allows a user, a young person or perhaps another person not willing or able to use one or more associated remote control units, to control several electronic devices such as a television, a DVD player, a radio tuner, an amplifier or similar equipment.

Figure 1:
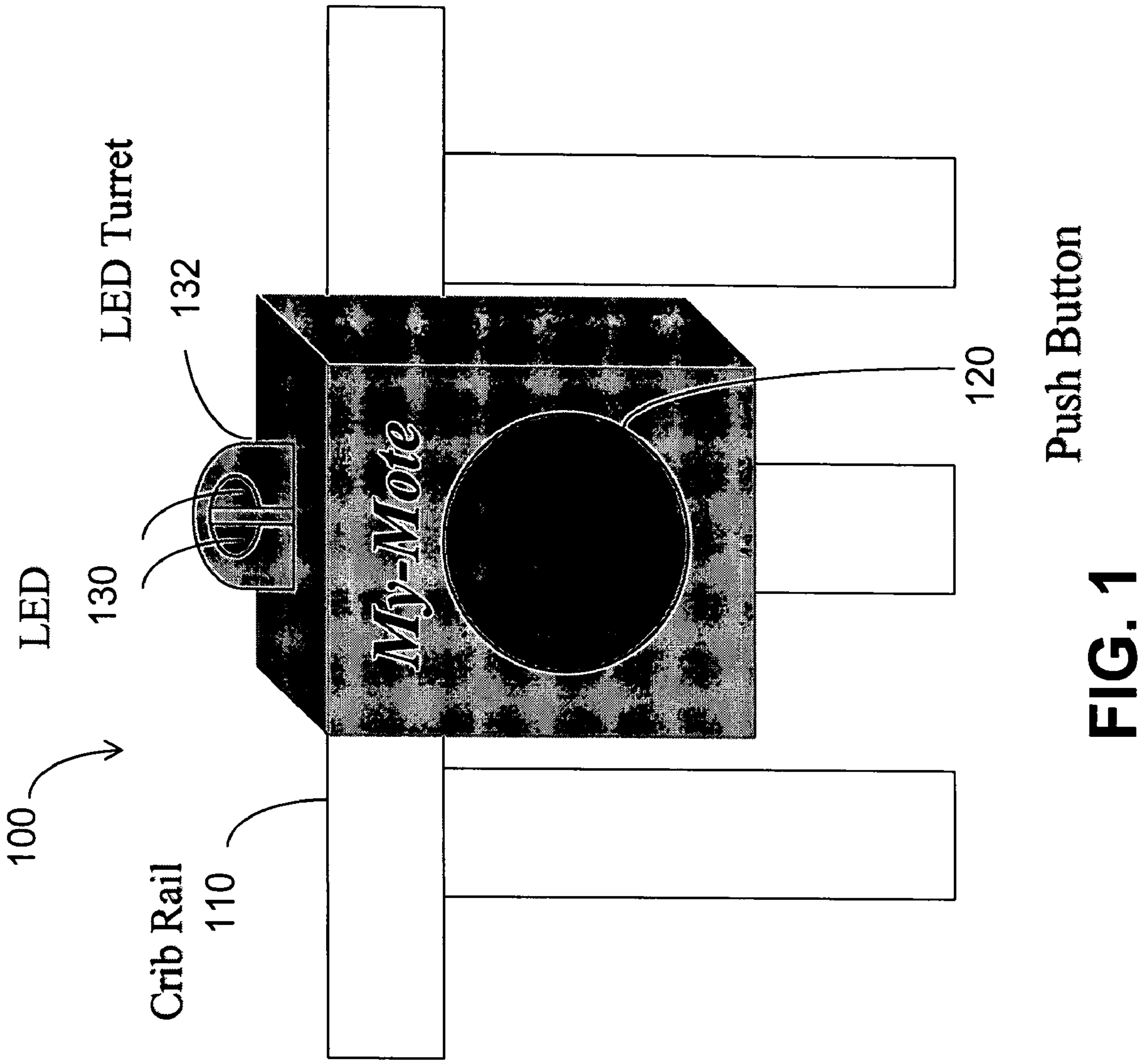
FIG. 1 illustrates an embodiment of a remote control viewed from within a crib and shows the front side of the control.

Referring to FIG. 1 there is illustrated a remote control unit 100 as seen from a typical user's viewpoint. In the illustrated embodiment, the remote control unit 100 is mounted on the rail 110 of a crib and the remote control unit has a large push button 120 on the front side, the user side, of the control that is available to activate a transmitter for transmitting an infrared ("IR") signal sequence to one or more pieces of electronic equipment. On the top of the remote control unit 100 are two light-emitting diodes ("LEDS") 130 that serve as a source for the IR signals for the unit. The two LEDS 130 are selected and positioned to provide a range of angular coverage, such as 180 degrees or more. Because of the range of angular coverage, the remote control unit 100 may be positioned so that it transmits IR signals to any equipment within a room.

Figure 2:
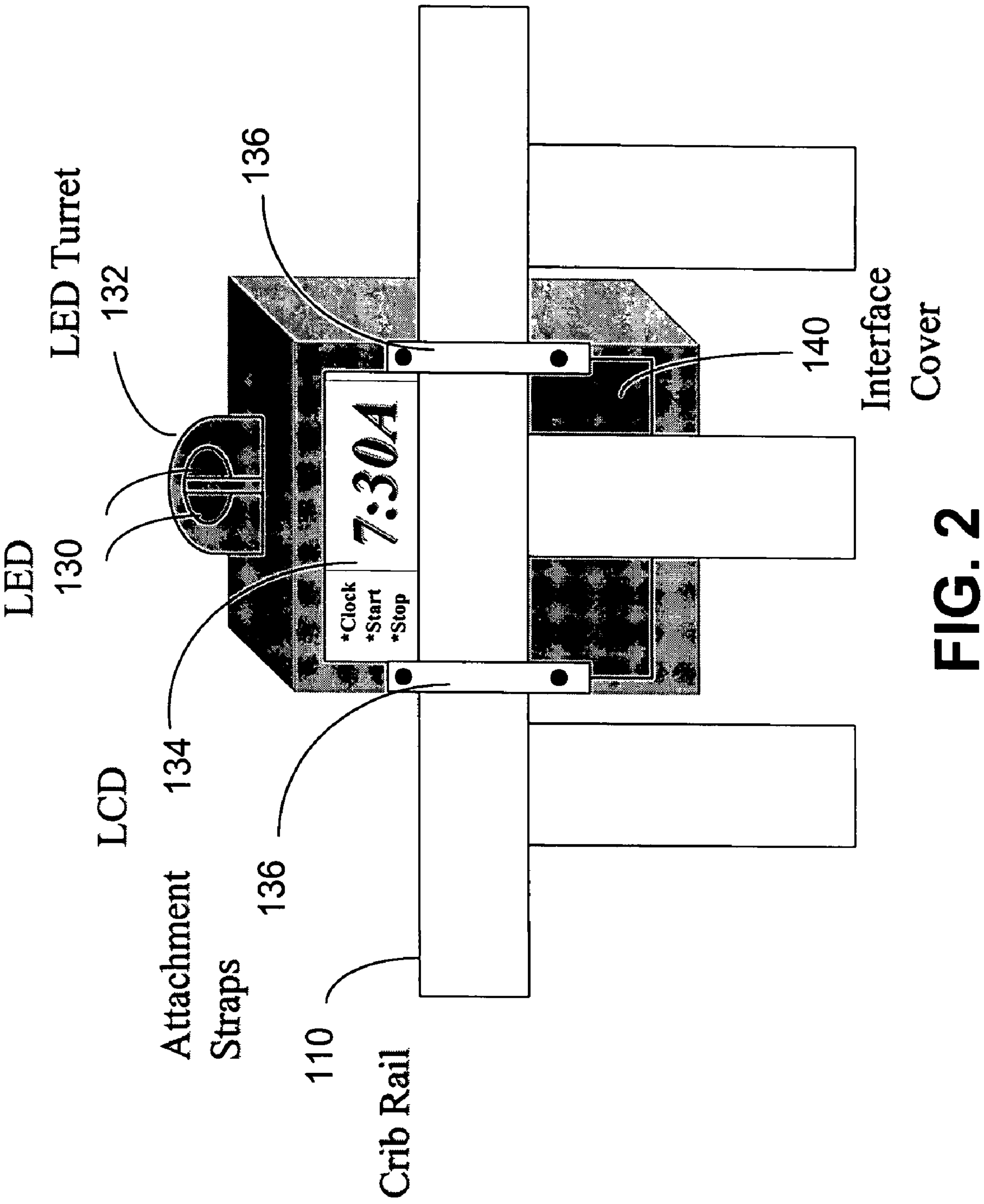
FIG. 2 illustrates the embodiment of FIG. 1 seen from outside the crib and shows the backside of the remote control.

FIG. 2 shows the back side (the programmer's side) of the remote control unit 100 as seen from outside the crib. The remote control unit 100 in one embodiment has a liquid crystal display ("LCD") that provides status, feedback and other information to the person ("programmer") programming the remote control unit. Examples of information on the LCD include the current time and start times and stop times for a prohibited use interval. Attachment straps 136 secure the remote control unit 100 to the crib rail 110. Behind one of the vertical slats of the crib rail, partially shown, is a removable interface cover 140.

Figure 3:
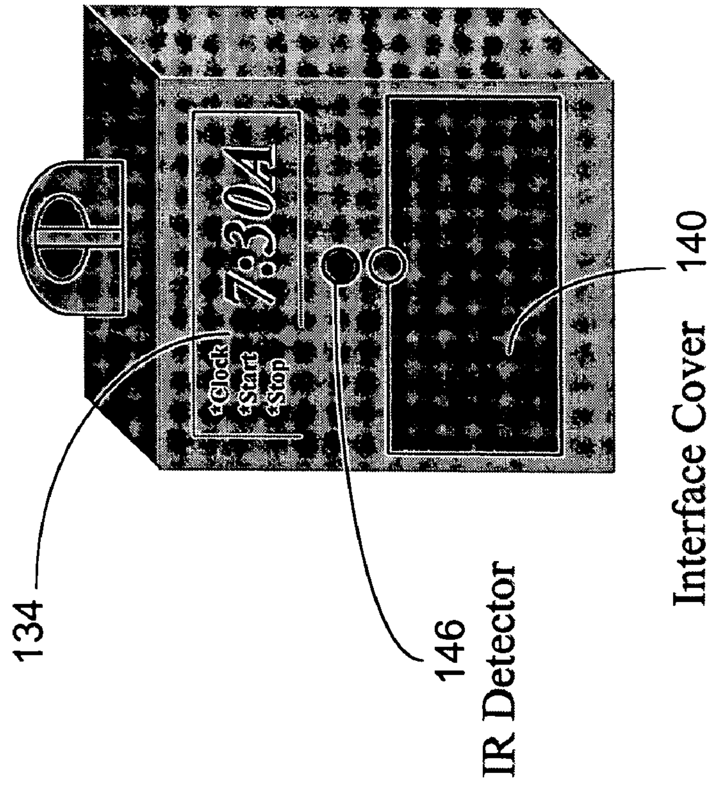
FIG. 3 illustrates the backside of the remote control of FIG. 1 showing the infrared detector.

FIG. 3 shows the programmer's side of the remote control unit 100 of FIG. 1 with attachment straps 136 removed. An interface cover 140 is removed by the programmer to access controls and other elements for programming the remote control unit 100. An IR detector 146 located on the programmer's side of the remote control unit 100 is shown in FIG. 3. The IR detector 146 serves as a receiver for IR signals transmitted from associated remote control units (units that typically come with televisions, DVD players, and other such equipment) and the detector is typically used during the learning mode of the remote control unit 100 as will be seen.

Figure 4:
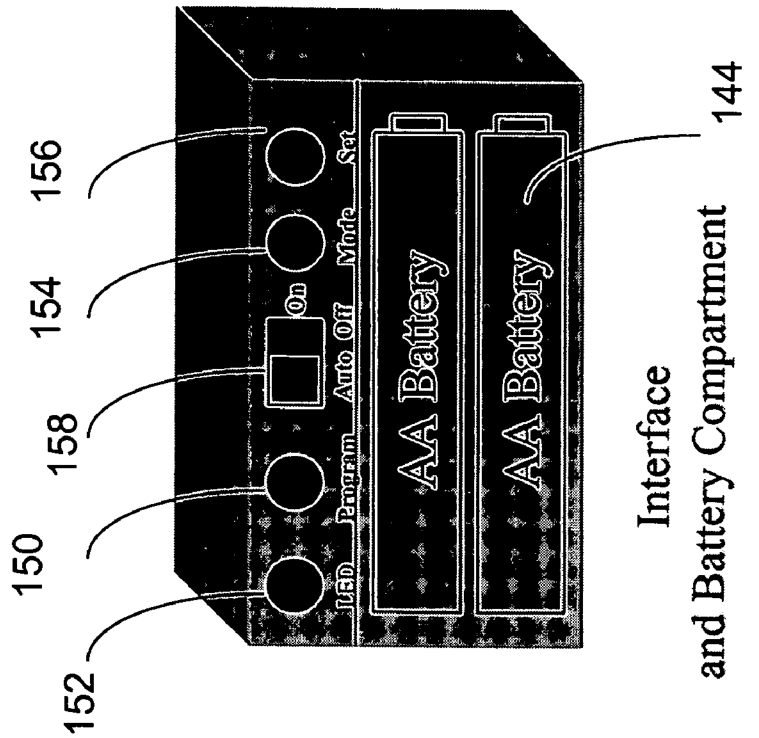
FIG. 4 illustrates the program and set buttons for the remote control of FIG. 1.

When the interface cover 140 is removed, as seen in FIG. 4, a battery compartment for installing/removing batteries 144 is available and a control interface is available for the programmer. The control interface has a status LED 152, three push buttons, and a switch. One of the buttons, a program push button 150 is used in combination with the status LED 152 during the learning mode of the remote control unit 100. The other buttons, a mode button 154 and a set button 156 are used to set the clock, set the start time for a prohibited time, and set the stop time for the prohibited time. Prohibited time or inactive time is a period of time when the remote control unit 100 is prohibited from transmitting IR signals. An auto-off switch 158 is used to turn off equipment at a preset time when desired.

Figure 5:
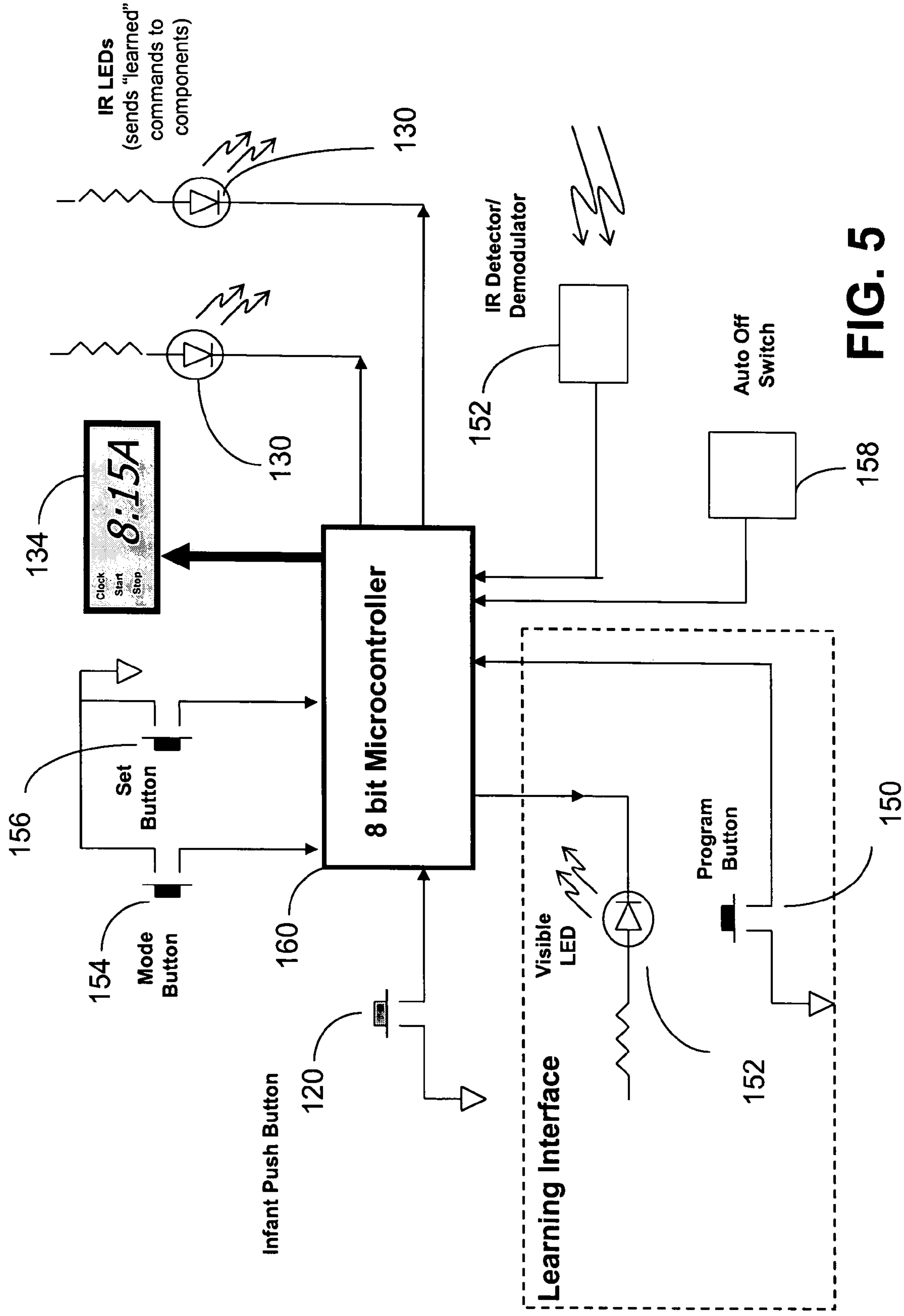
FIG. 5 is a block diagram of the remote control of FIG. 1.

A block diagram of the functional components of the remote control unit 100 is illustrated in FIG. 5. A microcontroller 160 interfaces with various input and output components of the remote control unit 100. The microcontroller 160 preferably has interfaces the functional components and memory and logic to provide the control as described in the state diagram of FIGS. 6 and 7. Those skilled in the art could provide a variety of interface, logic and memory devices to provide the functions of the block diagram of FIG. 5 and such variations would fall within the scope of the present invention.

When the remote control unit is in the learning mode, the IR detector 152 receives signals from video or other associated remote control units and decodes the signals and then forwards the decoded signals to the microcontroller 160. When the program button 150 is pushed the microcontroller 160 receives a signal and responds in accordance with control logic. The control logic preferably illuminates the status LED 152 for a given period of time in response to the push of the program button 150. The status LED 152 and the program button 150 operate together for allowing a programmer to implement an IR learning process as will be described in FIGS. 6 and 7. The mode button 154 and set button 156 are used to set the clock and a prohibited activity timer as will be seen when viewing FIG. 6. The result of setting the clock is viewed on the LCD 134. When the remote control unit 100 is in a run mode and a user presses the push button 120, IR signals are transmitted by the IR LEDS 130. After the push button is pressed once, a lock-out timer is started that causes the microcontroller 160 to ignore subsequent inputs from the push button 120 for a preset period of time, such as several minutes or up to an hour or so in order to prevent a user from repeatedly sending a command sequence. An auto-off feature of the remote control unit 100 causes the IR LEDS 130 to transmit signals for turning off video equipment at preset time or after a preset period of time. An auto-off switch 158 is available to activate or deactivate the auto-off feature. The transmitted IR signals contain information that is received and stored during the learning mode of the remote control unit 100.

In order to implement the functions and features of the remote control unit 100, the programmer provides information to the unit and a sequence of IR signals are sent from associated remote units to the remote control unit. The preferred steps for providing the information and the IR signals as inputs are now described in conjunction with FIGS. 6 and 7. Variation in the steps would be apparent to nearly anyone and particularly to someone skilled in the art.

When batteries 144 are installed in the remote control unit 100, the LCD 134 will show an hour and minute value and a colon between the values will be blinking. Further, when the remote control unit 100 first receives power, the unit initially is put in a main loop state 202 as shown in a state diagram 200 of FIG. 6. When in the main loop state 202, transitions may be made to either a set clock state 210, a send IR commands state 204 or a learning idle state 216 as seen in FIG. 7.

In one embodiment of the remote control unit 100 a transition from the main loop state 202 to a set clock state 210 occurs when the programmer pushes the mode button 154. When in the set clock state 210, pushing and holding the set button 156 causes the clock to rapidly change time, as is observed on the LCD 134. When the clock reaches the desired time value then the set button 156 is released. In one embodiment for setting the clock there is no reverse time direction for setting the clock. The method of setting the clock on the remote control unit 100 is similar to methods used on conventional electronic clocks that are found on variety of appliances and electronic equipment and such embodiments would fall within the scope of the disclosure. The method of clock setting for the remote control unit 100 as herein described is preferred in order to simplify programming and minimize cost. When the programmer has determined that the clock is set to a desired time, a push of the mode button 154 causes a transition from the set clock state 210 to the start inactive-time state 212. While in the start inactive-time state 212 the desired start time is set by pushing and holding the set button 156 as previously described. Next, the mode button 154 is pushed again and a transition is made to the stop inactive-time state 214. A desired stop-time is set by pushing and releasing the set button 156. A final push, the fourth push, of the mode button 154 causes a transition from the stop-time state 214 back to the main loop state 202.

The time interval between the start time and the stop time defines an inactive period for the remote control unit 100, during that interval time the push button 120 cannot activate the IR LEDs 130 that transmit control signals to the video equipment. Hence, during the inactive period, a time window, the user is unable to turn on or turn off the video equipment by pressing the push button 120. The time window provides a prohibited use interval in which a user cannot control any of the video or other electronic equipment. When the programmer has set all the timing values, the user is provided with a time window for using the remote control unit 100.

In order to provide a signal for controlling the video equipment it is necessary to gather video and other associated remote control units. The remote control unit 100 is placed in the learning mode and the IR detector 152 is aligned for receiving signals from the associated remote control units. The IR outputs of the associated remote control units then becomes inputs to the remote control unit 100 during the learning process. The remote control unit 100 must transition from the main loop state 202 to the learning idle state 216, shown in FIG. 7, in order for the desired control information to be received and stored in the remote control unit 100. While in the learning idle state 216, a first associated remote control unit is aimed towards the IR detector 152 and microprocessor 160 detects the presence of an IR signal from the first associated control unit. Upon detection of the IR signal, a transition is made from the learning idle state 216 to the collecting commands state 218. The first command signals transmitted from the first associated remote control unit are received and replicas are stored in memory of the microprocessor 160. Typically the IR signals sent from the first associated remote control unit (and subsequent units) and received by the IR detector 152 are of a short duration and after they have been received a transition is made to the command collected state 219. After the programmer is notified of the change of state by a single blink of the status LED 15 a transition is made from the command collected state 219 to the user delay collected state 220. In state 220 the elapsed time between commands is recorded. When a second associated remote control unit, if necessary, is aligned with the IR detector 152 and a second IR signal is sent then a transition again occurs to the collecting commands state 218 and a the second IR signal is detected and stored along with delays between commands. When a transition is again made to the commanded collected state 219, the programmer is notified by a blink of the status LED 152. Additional sets of IR signals may be detected and stored in the manner described above. After all commands have been collected a transition is made from the user delay state 220 to the main loop state 202. The inventor has determined that the preferred storage capacity for IR signals is five. However it may be necessary for the remote control unit 100 to have a storage capacity greater than five in order for some systems to obtain the full benefit of the remote control unit 100 disclosed herein. Compression techniques may be used to improve the memory efficiency in another embodiment of the present disclosure. Such compression techniques are well-known by those skilled in the art.

Figure 6:
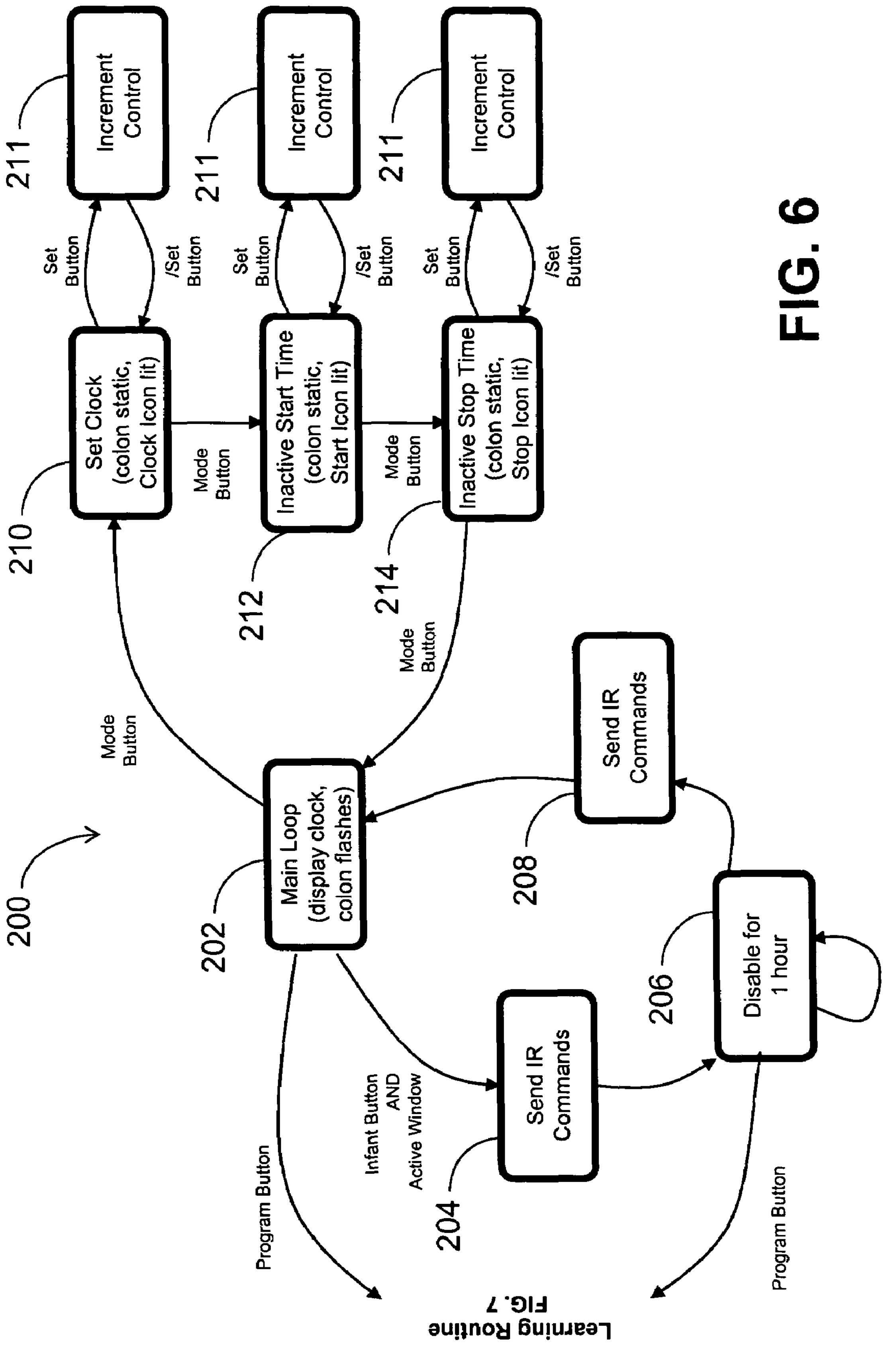
FIG. 6 is a state diagram for the remote control of FIG. 1.
Figure 7:
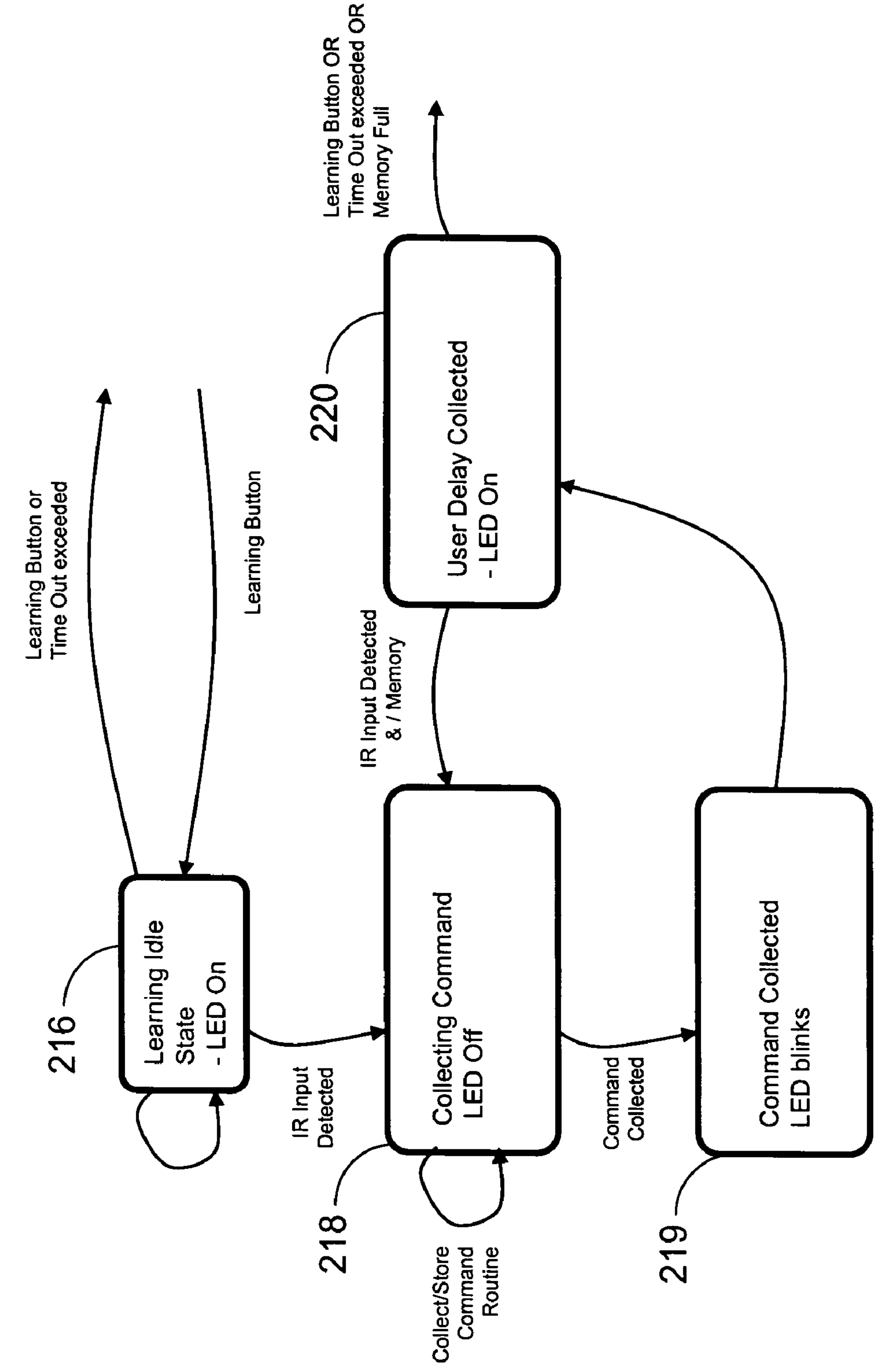
FIG. 7 is a continuation of the state diagram of FIG. 6 and FIG. 14.
Figure 8:
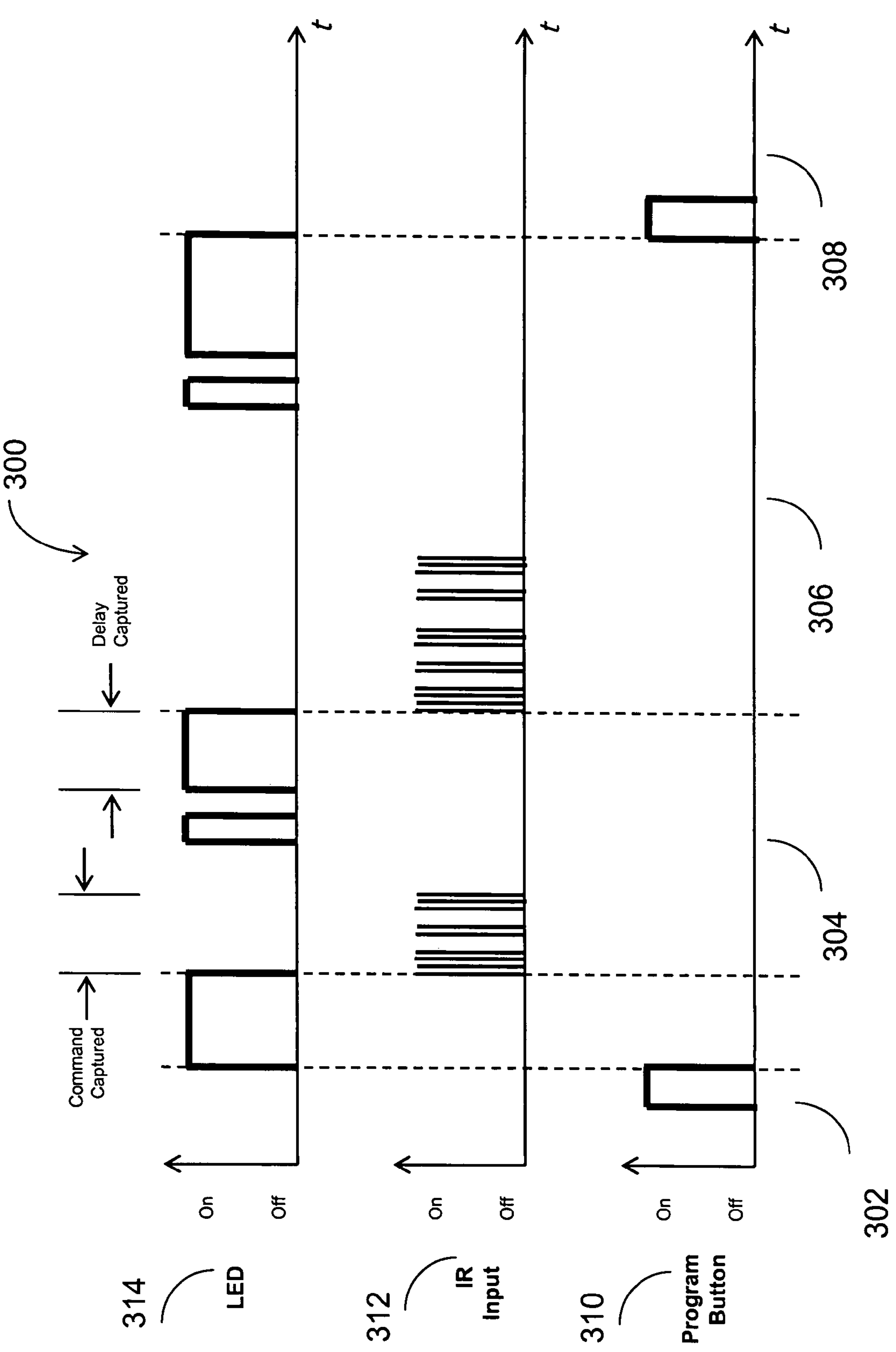
FIG. 8 is a timing diagram illustrating the sequence of steps for programming the remote control of FIG. 1.

A timing diagram 300, shown in FIG. 8, illustrates the receive and store process described in FIGS. 6 and 7. During a first time interval 302, the program button 150 is pushed as shown by a positive pulse on the program button graph 310. When the program button is released the status LED turns on as shown by a first pulse on the LED graph 314. When the first command signal from the first IR signal, a command signal, is detected by the microcontroller 160 the status LED 152 turns off. A series of IR pulses, shown in on IR Input graph 312, is then received, detected and stored by the microcontroller 160. When no more IR pulses are detected in the first IR signal then a single blink is emitted from the status LED, shown as the second pulse shown on the LED graph 314. The status LED 152 emits a continuous light until a second IR signal, shown as the second group of pulses on the IR input graph 312, is detected by microprocessor 160. Once the second IR signal is recorded, the status LED blinks once as seen on the LED graph 314 and then emits continuous light. If the learning process is complete, the program button 150 is preferably is pressed by the programmer and the status LED 152 is turned off.

The control unit 100 stores an entire sequence of signals and delays needed to turn-on video equipment. For example, the delays that occur when a DVD player is activated and started are contained in the sequence provide by control unit 100.

To understand the capability of the remote control unit 100, consider the steps required for viewing a program using a television/DVD-player combination. First a user turns on the television and then selects the input terminals on the television for receiving video and audio signals from the DVD player. Next the DVD player is turned on (it is assumed that a DVD disk is in the unit) and a play command is sent to the player. Because of previews and an FBI warning it is generally necessary to push the menu button and the play/enter button several times. The number of pushes and the amount of time between each push of the play button varies with the equipment manufacturer and the content supplier (the maker of the DVD disk). Hence it is necessary to store not only commands, but to store time delays that occur between and within the commands. The remote control unit 100 learns not only the commands emitted by the associated remote control units, but learns and stores the delays so that pushing the push button 120 will replicate the sequence generated by a person using each associated remote unit and waiting out time delays so the DVD disk will furnish the desired program.

Figure 9:
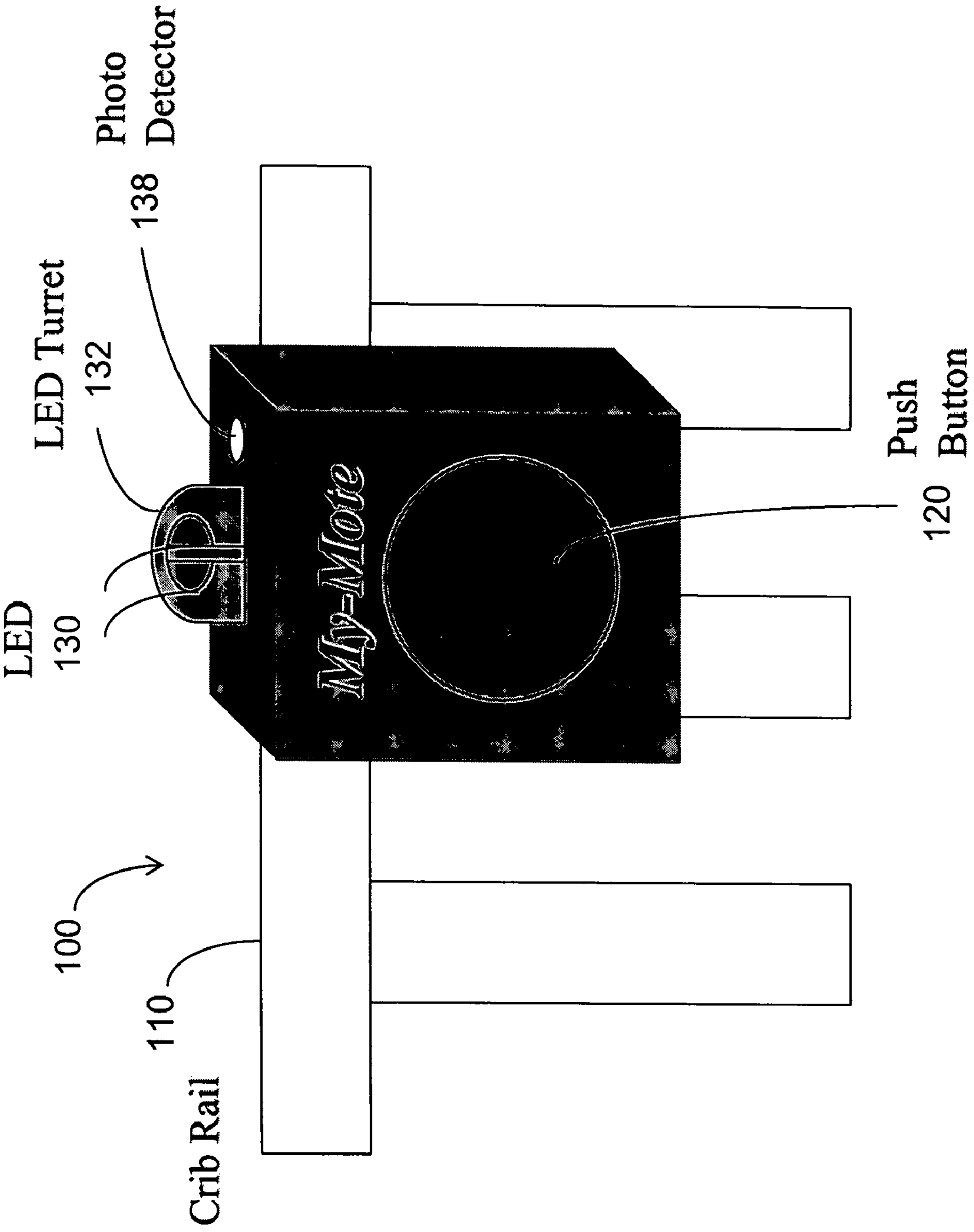
FIG. 9 illustrates a second embodiment of a remote control.
Figure 10:
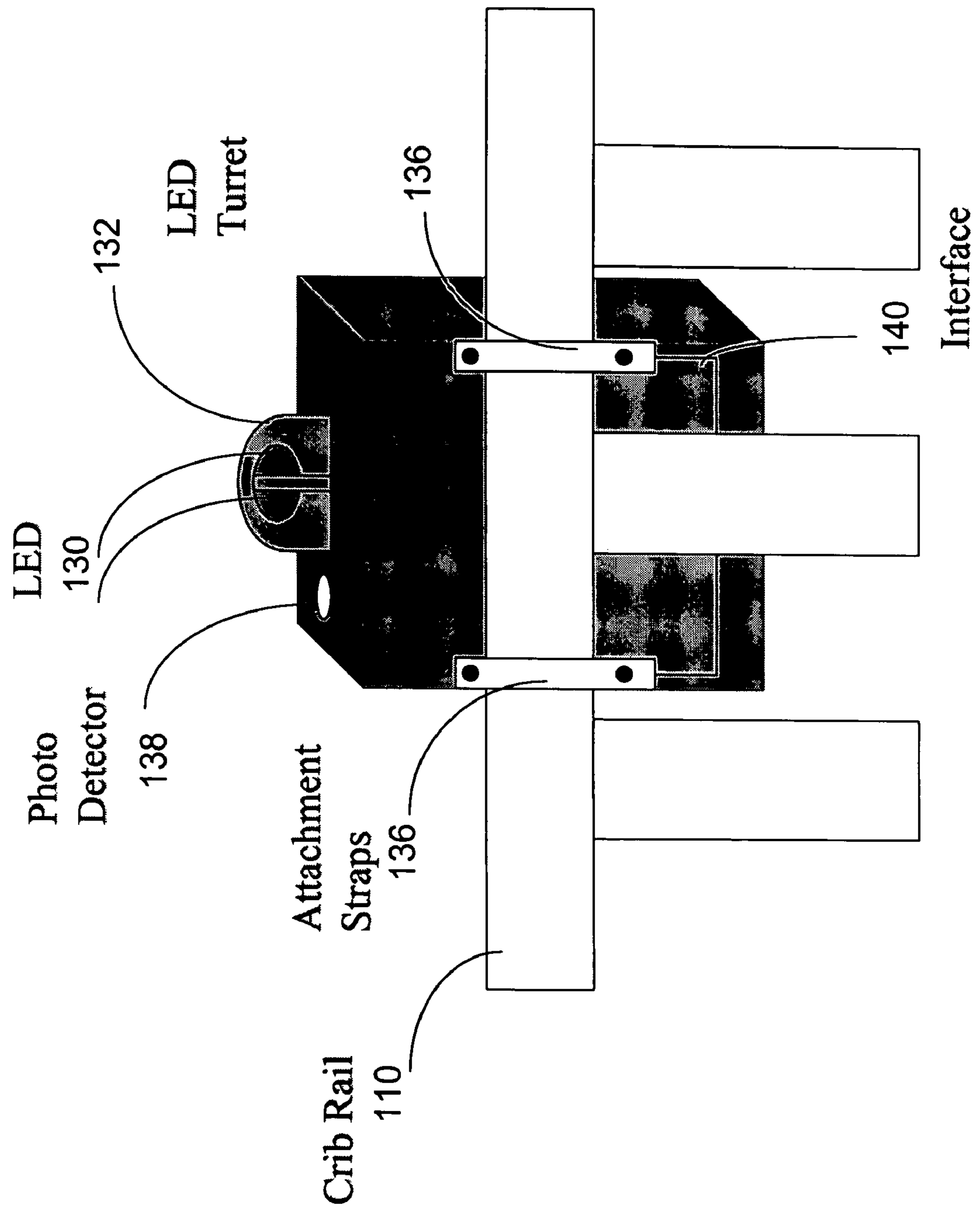
FIG. 10 illustrates another view of the remote control of FIG. 9.

In another embodiment of the remote control unit 100, a photo detector 138, as shown in FIG. 9, is used to select an prohibited period of use, such as for night time or sleep time. When the photo detector 138 provides a signal to the microcontroller 170 that is indicative of a low light level the microcontroller 170 prohibits the IR LEDS 130 from transmitting signals. In this embodiment there is no clock and hence the programmer is not required to set a clock or a start time and a stop time. However it is still necessary for the remote control unit 100 to learn the IR sequence to turn on the video equipment used to display a program. The photo detector embodiment of the remote control unit 100 is shown mounted on a crib in FIG. 10 and has the interface cover 140.

Figure 12:
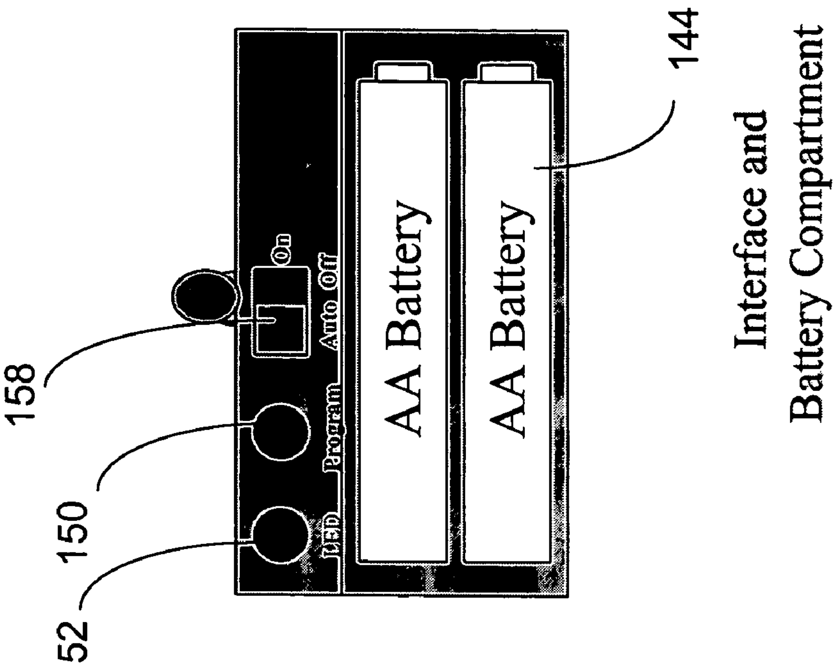
FIG. 12 illustrates the program and set buttons for the remote control of FIG. 9.
Figure 11:
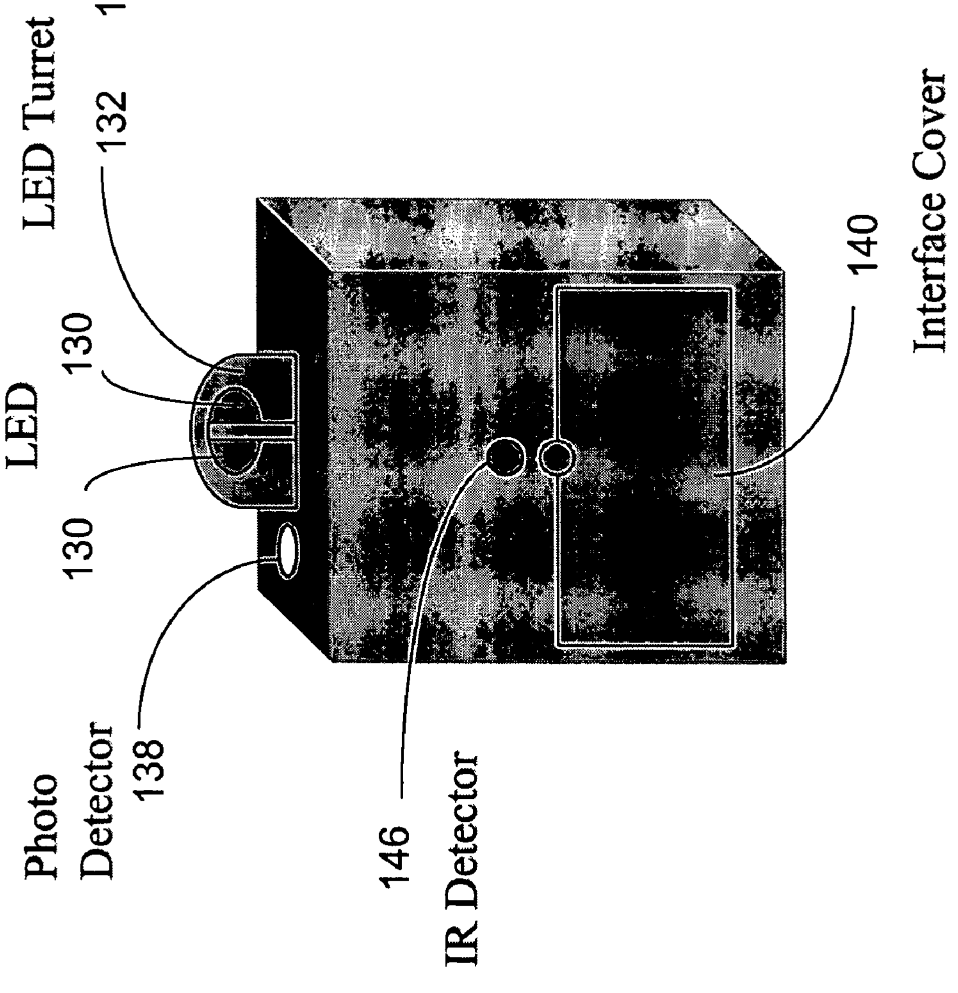
FIG. 11 illustrates the backside of the remote control unit of FIG. 9 showing the infrared detector.
Figure 13:
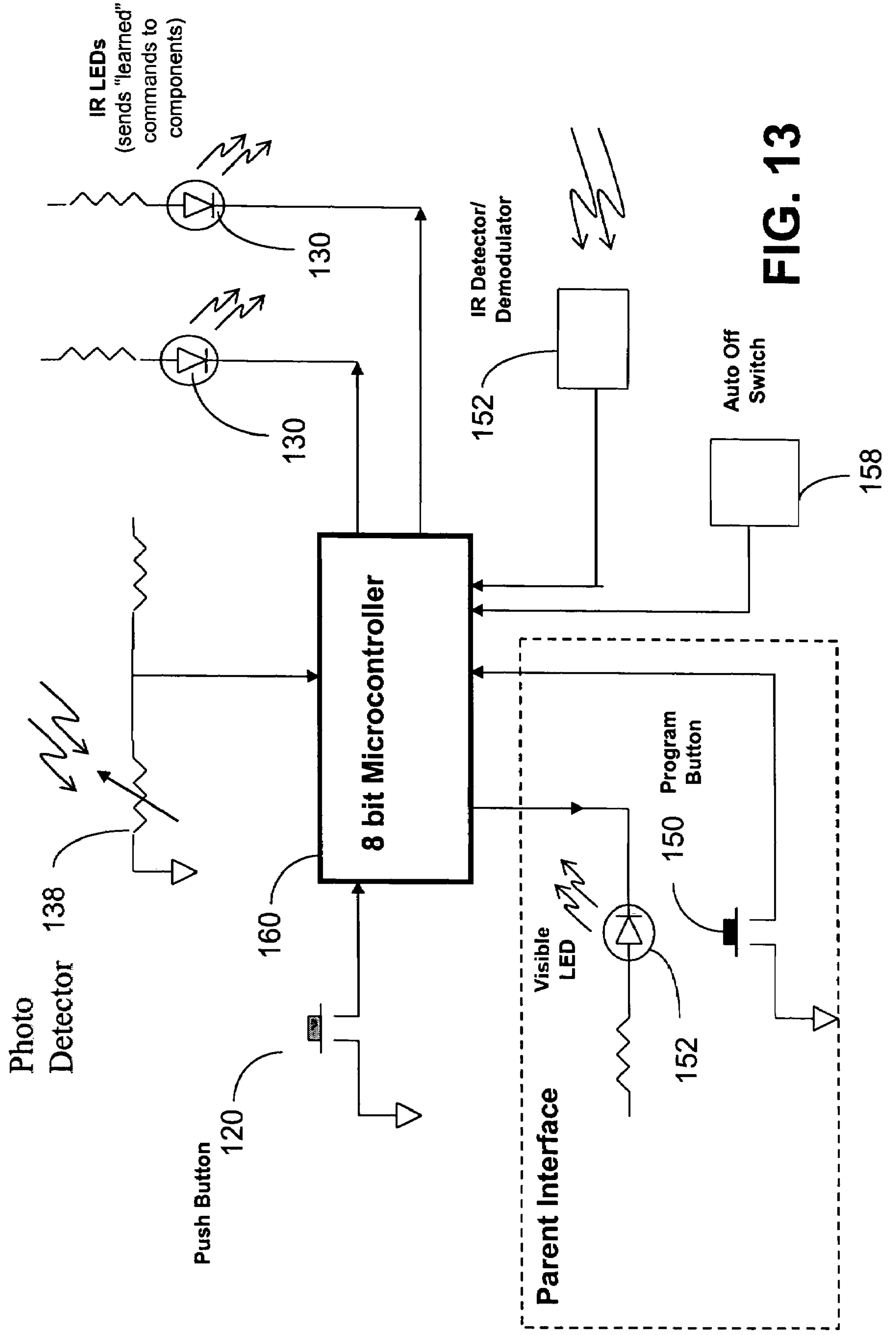
FIG. 13 is a block diagram of the remote control of FIG. 9.

When the interface cover 140 as shown FIG. 11 is removed, the controls and battery compartment as shown in FIG. 12 are visible. The status LED 152 and program button 150 function as previously described with respect to FIGS. 3 and 4. The auto-off switch 158 is preferably available in the photo detector embodiment of the remote control unit and functions as early described. The differences in the features of the first embodiment are best illustrated by comparing FIG. 5 to FIG. 13.

Figure 14:
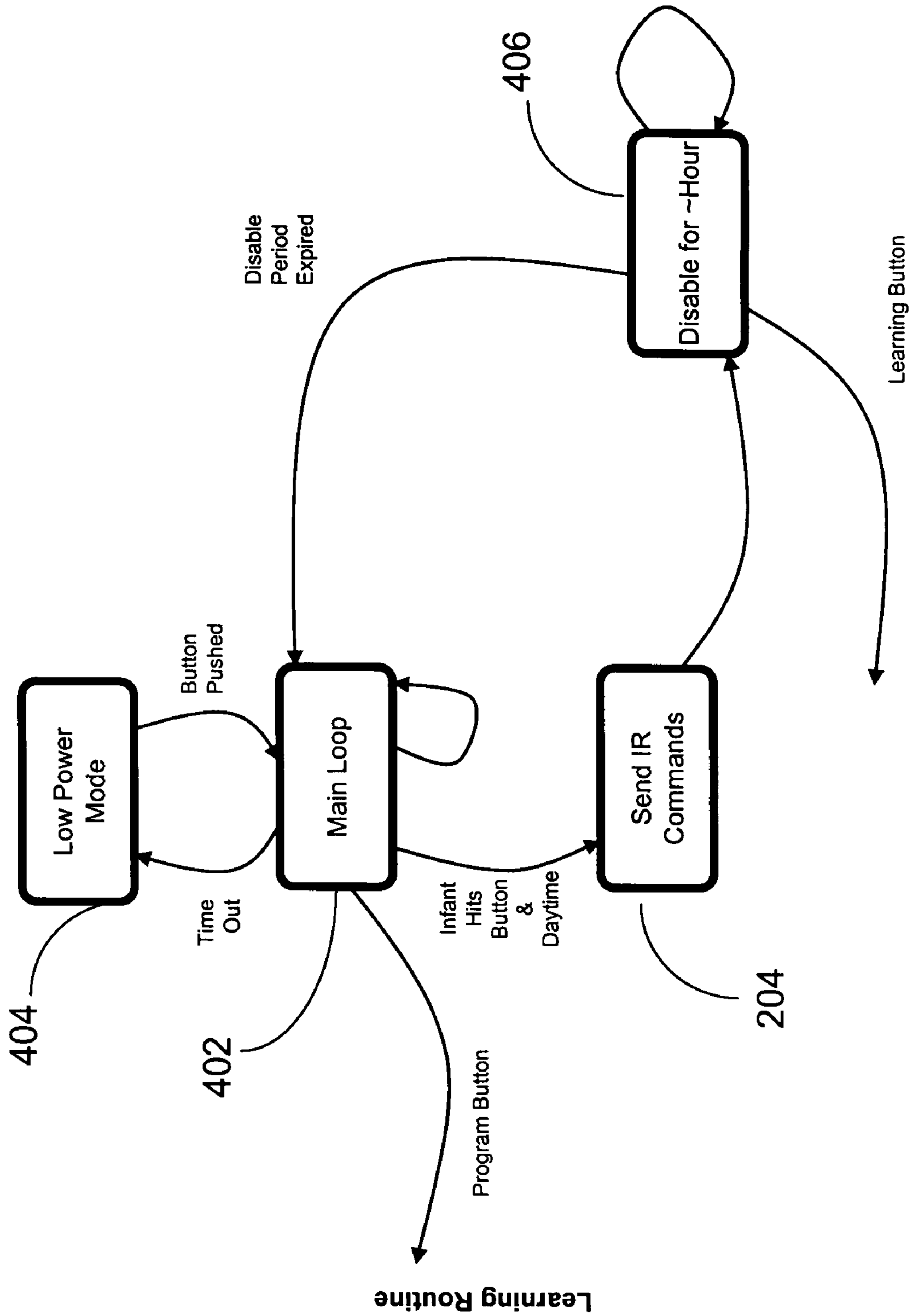
FIG. 14 is a state diagram of the remote control of FIG. 9.

A state diagram illustrating the implementation of the photo detector controlled remote control unit is illustrated in FIG. 14. When power is first applied to the remote control unit 100, the unit goes to a main loop state 402. When the push button 120 is pushed and the photo detector 138 indicates the daytime condition, the remote control unit 100 transitions from the send IR command state to the disable state 406 and back to the main loop state 402. The remote control unit 100 transitions to the learning mode (FIG. 7) when the program button 150 is pushed.

It should be further emphasized that the above-described embodiments of the present invention are merely possible examples of implementations and set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

Now, therefore, the following is claimed:

1. A remote control unit for controlling one or more electronic devices, the remote control unit comprising:

a receiver for receiving command signals from associated remote control units;

a timer for measuring the time delay between receiving each command signal from said associated remote control units;

logic for storing and retrieving said command signals and said delay between each command signal in the exact order received;

a push button for a user to press that causes the remote control to emit a replica of command signals and delays for controlling the one or more electronic devices; and a light detector to prevent said remote control from emitting a replica of command signals and delays when the light level is below a selected value.

2. The remote control unit of claim 1 further having a turret that contains one or more IR LEDS.

3. The remote control unit of claim 1 further having the logic to emit said replica of commands and delays again automatically after a selected period of time.

4. The remote control unit of claim 1 wherein the remote control unit of claim 1 has a learning mode for storing commands from associated remote control units and for recording delays between commands.

5. The remote control unit of claim 1 further having a programmable clock having a time-on value and a time-off value that provide a time window when the remote control unit is prohibited from emitting the replica of commands and delays.

6. The remote control unit of claim 1 further having a lock out function that disables said push button for a selected period of time after it has been pushed the first time to prevent repeated transmission of command and delay sequence.

7. A method for remotely controlling electronic equipment, the method comprising the steps of:

recording command signals and the delay between receiving each said command signal from associated remote control units of said electronic equipment;

pushing a button for transmitting a replica of commands and delays for sequentially commanding the electronic equipment to provide a desired function; and prohibiting the transmission of said replica of commands and delays when light levels are below a selected value.

8. The method of claim 7 wherein an additional step of prohibiting transmission of a replica during a selected time interval.

9. The method of claim 7 wherein the replica of commands and delays is broadcast at an angle greater than 180 degrees.

10. The method of claim 7 wherein transmitting a replica is repeated after a predetermined time.

11. The method of claim 7 wherein the replica information is stored in memory using a compression algorithm.

12. A remote control unit for controlling electronic equipment the unit comprising:

a push button for initiating the transmission of command sequences with the associated time delays between commands destined for the electronic equipment;

a receiver for receiving signals from associated remote control units, the receiver having an IR detector for detecting IR signals;

a light detector to prevent the transmission of the command sequences when the light level is below a selected value; and logic for directing signals and information to and from memory within the remote control unit.

13. The remote control unit of claim 12 wherein the transmission of the command sequence is emitted from an LED turret on top of the remote control unit.

14. The remote control unit of claim 12 wherein a display unit provides status information about the remote control unit.

15. The remote control unit of claim 14 wherein time values are displayed on the display unit.

16. The remote control unit of claim 12 wherein the transmission of the command sequence is prohibited for a selected value of time.

17. The remote control unit of claim 12 further having a holster for mounting the remote control and to conceal selected programming buttons.

18. The remote control unit of claim 15 wherein time values are set using a mode button and a set button.

19. The remote control unit of claim 12 further having a lock out function that disables said push button for a selected period of time after it has been pushed the first time to prevent repeated transmission of the command sequence.

20. The remote control unit of claim 12 wherein an LED signals a programmer when a command is stored.

* * * * *